United States Patent

Paff et al.

[11] Patent Number: 5,801,770
[45] Date of Patent: Sep. 1, 1998

[54] SURVEILLANCE APPARATUS WITH ENHANCED CONTROL OF CAMERA AND LENS ASSEMBLY

[75] Inventors: Robert Paff, Boca Raton; Carl Kupersmit, Lake Worth; Lawrence R. Mills, Coral Springs; Edwin Thompson, Loxahatchee, all of Fla.

[73] Assignee: Sensormatic Electronics Corporation, Deerfield Beach, Fla.

[21] Appl. No.: 306,535

[22] Filed: Sep. 15, 1994

Related U.S. Application Data

[63] Continuation of Ser. No. 48,582, Apr. 14, 1993, which is a continuation of Ser. No. 739,119, Jul. 31, 1991, abandoned.

[51] Int. Cl.[6] ................................................ H04N 5/232
[52] U.S. Cl. .......................... 348/211; 348/143; 348/358; 348/375
[58] Field of Search ............................. 348/207, 211, 348/143, 145, 146, 147, 148, 149, 169, 358; 354/81, 82; 396/77, 78, 85; H04N 5/30, 7/18

[56] References Cited

U.S. PATENT DOCUMENTS

| | | |
|---|---|---|
| 3,579,072 | 5/1971 | Plummer et al. . |
| 4,120,004 | 10/1978 | Coutta . |
| 4,337,482 | 6/1982 | Coutta . |
| 4,728,839 | 3/1988 | Coughlan et al. . |
| 4,805,018 | 2/1989 | Nishimura et al. . |
| 4,811,091 | 3/1989 | Morrison et al. . |
| 4,937,675 | 6/1990 | Starceski . |
| 4,945,367 | 7/1990 | Blackshear . |
| 4,974,088 | 11/1990 | Sasaki . |
| 5,028,997 | 7/1991 | Elberbaum . |
| 5,068,735 | 11/1991 | Tuchiya et al. . |
| 5,268,734 | 12/1993 | Parker et al. ............ 250/203.3 |
| 5,570,177 | 10/1996 | Parker et al. ............ 348/213 |

FOREIGN PATENT DOCUMENTS

| | | | |
|---|---|---|---|
| 2-140073 | 5/1990 | Japan | H04N 5/232 |
| 6-22183 | 1/1994 | Japan | H04N 5/232 |

OTHER PUBLICATIONS

Patent Abstracts of Japan, vol. 10, No. 177 (P-470) 21 Jun. 1986 & JP-A-61 025 215 (Toshiba Corp) 4 Feb. 1986 Abstract.

Patent Abstracts of Japan, vol. 8, No. 214 (P-304) 29 Sep. 1984 & JP-A-59 095 614 (Toshiba KK) 1 Jun. 1984 Abstract.

*Primary Examiner*—Andrew I. Faile
*Assistant Examiner*—Tuan V. Ho
*Attorney, Agent, or Firm*—Robin, Blecker & Daley

[57] ABSTRACT

A surveillance device having a camera and lens assembly in which a condition of the assembly is controllable by a movable part and in which a closed loop digital motion control system is used to control the movable part and, therefore, the condition. The closed loop motion control system includes a dedicated digital signal processor which is used exclusively to control the movable part. The digital motion control system also includes a drive motor which is responsive to the digital signal processor and a digital encoder which monitors the position of the movable part and provides encoded position signals to the processor. Movable parts for the pan and tilt assemblies of the surveillance device are controlled by separate closed loop motion control systems each having its own dedicated digital signal processor.

25 Claims, 3 Drawing Sheets

SURVEILLANCE APPARATUS WITH ENHANCED CONTROL OF CAMERA AND LENS ASSEMBLY

This is a continuation application under 37 CFR 1.62 of prior application Ser. No. 08/048,582, filed Apr. 14, 1993, which is a continuation of Ser. No. 07/739,119, filed Jul. 31, 1991, now abandoned.

BACKGROUND OF THE INVENTION

This invention relates to a surveillance apparatus and, in particular, to a surveillance apparatus to be used in a closed circuit television (CCTV) system.

Present day CCTV systems use a variety of surveillance devices to monitor a location. Typical of these surveillance devices are video monitoring devices which employ a camera and lens assembly. This assembly is usually supported by a housing which is fixedly mounted at the location. The housing is often closed off by a dome made of a plastic or other material.

The camera and lens assembly of the surveillance device define a viewing axis along which the assembly views an image or scene at the location. The lens of the camera and lens assembly conveys the viewed image to an image pickup of the camera where it is converted into an electrical signal. This signal is then conveyed to a monitor at a central location for viewing by the CCTV system operator.

Typically, the camera and lens assembly in a video surveillance device includes one or more movable parts whose positions control one or more conditions of the assembly. Adjusting mechanisms (e.g., motors, motor drive circuits and gearing arrangements) are further provided for adjusting the positions of the movable parts so as to alter or change the corresponding conditions of the assembly.

A characteristic of the assembly which is controlled in this fashion is the aforementioned assembly viewing axis. Movable mountings which support the assembly in the housing permit the viewing axis to be tilted in a tilt direction (usually the vertical direction) and panned in a panning direction (usually the horizontal direction).

In addition to the pan and tilt conditions of the assembly, other conditions of the assembly controlled by movable parts are various conditions of the lens portion of the assembly. Typical of these conditions are the so-called focus, zoom and iris conditions of the lens assembly.

The focus condition of the lens assembly determines the distance from the assembly at which an image captured by the lens assembly becomes sharply focused on the camera image pick-up. For a given distance, a sharp image corresponds to an in-focus condition and a blurry image an out-of-focus condition.

The zoom condition of the lens assembly, on the other hand, determines the extent of the field of view of the assembly and the size of the images in the field. Fields of view of wide extent have smaller size images and correspond to wide angle conditions of the assembly, while fields of view of smaller extent have larger image sizes and correspond to telephoto conditions of the assembly.

The iris condition of the lens assembly determines the level of light of the image being received in the assembly. A fully open iris condition corresponds to a maximum light level and a fully closed iris condition to a minimum light level.

Each of the aforesaid focus, lens and iris conditions of the lens assembly is typically controlled by a movable part in the form of a rotatable barrel situated along the lens axis. Rotation of a given barrel via a drive motor and gearing arrangement effects the desired change in condition. Similarly, motor and gearing arrangements are used to drive the camera and lens assembly to effect the desired pan and tilt conditions.

In many of the current surveillance devices, the movable parts for controlling the pan, tilt, zoom, focus and iris conditions are usually driven at fixed speeds. As a result, if the CCTV operator is trying to maintain the viewing axis on a moving object which is passing close to the surveillance device, the fixed speeds for the pan and tilt movable parts may not be fast enough to follow the motion. On the other hand, if the surveillance device is in a telephoto or zoomed-in condition, the same pan and tilt speeds may now be too fast and cause a large change in position. This makes it difficult to accurately position the viewing axis because the camera "overshoots" the image desired to be viewed. In such case, the operator may have to alternate between right/left panning or up/down tilting several times before the viewing axis is on the desired image.

Similar difficulties sometimes occur in setting the zoom, focus and iris conditions of the assembly under various conditions. In particular, with the assembly in wide-angle condition and in high ambient lighting (i.e., the iris is substantially closed and the zoom setting is at wide-angle), the movable part controlling the focus condition must be moved at a sufficiently fast speed to allow the operator to traverse the full focus range. However, under telephoto conditions and in a low-light environment (i.e., the iris is substantially open and the zoom condition is at telephoto), the same focusing speed may be too fast, making it difficult for the operator to properly focus on the subject. Typically, the operator will have to alternate between focus-near and focus-far several times (due to over-shooting the optimum focus setting) before a proper focus is achieved. This makes the adjusting process difficult and time consuming.

In using the above-type of surveillance devices, there are usually one or more critical areas of the location in the viewing range of any device. These critical areas in a location might include the location entrance, the loading dock area of the location or a cash register or a jewelry display area of the location. In response to certain events, the operator needs to access these "targets" with the surveillance device quickly and accurately.

This is generally carried out by the operator manually adjusting controls to appropriately move the above-mentioned movable parts of the camera and lens assembly. However, making these adjustments is time consuming and, as a result, the operator may miss an image which has moved from the target area.

There is also a requirement in above-type of surveillance devices to detect when the movable parts controlling the various, conditions (i.e., tilt, zoom, focus and iris) of the camera and lens assembly have reached their end-of-travel position (this is usually not required for the pan condition, since the movable part controlling this condition continuously moves and does not have an end-of-travel point). Failure to provide such end-stop or end-of-travel detection could result in damage to the respective drive motor and/or gear arrangement when the part in question impacts the end of travel mechanical stop. In present devices, there are three techniques used for end-stop detection.

The first technique uses two switches per movable part (one at each end of travel), which are mechanically activated as the part approaches the end stop. This technique is disadvantageous due to the cost of the switches, the necessity to adjust the switches at time of assembly, and the reliability of the switches.

The second technique uses a slip-clutch assembly so that when the part impacts the end stop, the clutch resistance is overcome and the drive motor continues to operate (is not forced to an abrupt stop), although the movement has stopped. This approach suffers from the same shortcomings as the switch technique, i.e., high cost, adjustment, and the reliability of the clutch adjustment over time.

The third technique detects the increase in drive motor current that occurs when the end-stop is hit by the moving part which is forced to an abrupt stop. This technique is disadvantageous in that damage can occur to the motor and gear arrangement, since it allows the end-stop to be impacted.

A surveillance device which offers improvements over the above more conventional surveillance devices is disclosed in U.S. Pat. No. 4,945,367 issued in the name of Blackshear. In the Blackshear patent, the pan, tilt, focus, zoom and iris conditions of the camera and lens assembly are controlled by an on-board computer. The on-board computer provides control voltages to the focus, zoom and iris functions and to the pan and tilt functions. These functions, in turn, provide feedback data to the computer.

Blackshear also discloses the use at the operator console of a joystick which undergoes x-y movement for sending pan and tilt control information to the on-board computer for changing the pan and tilt functions. The operator can also provide to the on-board computer zoom control information via a rotatable knob on the joystick and focus and iris control formation via switches on the control panel. Blackshear teaches that the pan and tilt movement rates are proportional to the x-y movement of the joystick so that the camera can be moved slowly to track slow moving objects, quickly to move to a desired scene, or variably to track variable speed objects.

The Blackshear patent also teaches that the on-board computer can operate the camera and lens assembly in an automatic mode in which it moves the assembly through a sequence of set targets. The computer stores the pan, tilt, focus, zoom and iris settings for each of these targets and causes these to be established for a target as the assembly is moved to the target. Also mentioned is that if an alarm condition occurs, the on-board computer can move the camera and lens assembly directly to the alarm area. Blackshear states that this can be done at high slew rates for the pan and tilt motion because of the kinematic balance of the components of the camera and lens assembly.

The Blackshear patent thus overcomes certain of the disadvantages of the above-discussed more conventional surveillance devices which use camera and lens assemblies. However, a number of these disadvantages still remain.

It is therefore an object of the present invention to provide a surveillance apparatus of the above-type in which control of the movement of the parts of the device is more efficiently and accurately accomplished.

It is a further object of the present invention to provide a surveillance device of the above-type in which the movement of the movable parts of the device is accomplished smoothly and without abrupt starts and stops.

It is also an object of the present invention to provide a surveillance device of the above-type with improved end stop control of the movable parts.

It is yet a further object of the present invention to provide a surveillance device of the above-type with improved focus and zoom control.

It is also an object of the present invention to provide a surveillance device of the above-type with improved program control.

SUMMARY OF THE INVENTION

In accordance with the principles of the present invention, the above and other objectives are realized in a surveillance apparatus comprising a camera and lens assembly which is movable at least in part to control a condition of the assembly and, in which, a closed loop digital motion control means or system, responsive to the movable part of the assembly, is provided to control the movable part and, therefore, the corresponding condition of the assembly. In further accord with the invention, the closed loop control system, preferably controls the movable part using a pulse width modulation (PWM) signal so that highly accurate, efficient and smooth control can be achieved.

More particularly, by using the closed loop digital motion control means with PWM signalling, the acceleration of the movable part can be varied over a wide range of speeds. The movable part being controlled can thus be made to start and stop or change from one speed to another without any abrupt movements. This is preferably accomplished by the closed loop means gradually changing the speed of the movable part in realizing the desired movement.

The closed loop system is also adapted to store end stop positions for a movable part. By comparing the current position of the movable part with these stored end stop positions, the movable part can thus be easily and accurately stopped at the end stop positions.

Where movable parts of the assembly are used to control the pan and tilt conditions of the assembly and the assembly also includes a movable part for controlling the zoom condition of the assembly, the closed loop system of the invention can be adapted to be responsive to the zoom condition of the assembly when adjusting the movable parts controlling the pan and tilt conditions.

Where the movable part of the assembly controls the focus condition of the assembly and the assembly also includes movable parts for controlling the iris and zoom conditions of the assembly, the closed loop system can be additionally adapted to be responsive to the iris and zoom conditions of the assembly in adjusting the movable part controlling the focus condition.

The closed loop system may also comprise a program controlled processor and a memory for storing the processor program. This memory can be selected to be electrically reprogrammable from remotely of the surveillance apparatus.

In the embodiment of the invention to be disclosed hereinafter, the camera and lens assembly includes a movable part for controlling each of the pan, tilt, focus, zoom and iris conditions of the assembly. The closed loop control system includes a plurality of central processors and dedicated digital signal processors which cooperate to provide closed loop digital control of the movable parts. The closed loop system also includes a plurality of control algorithms or programs which can be accessed by the central processors and digital signal processors to provide various speed control characteristics.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
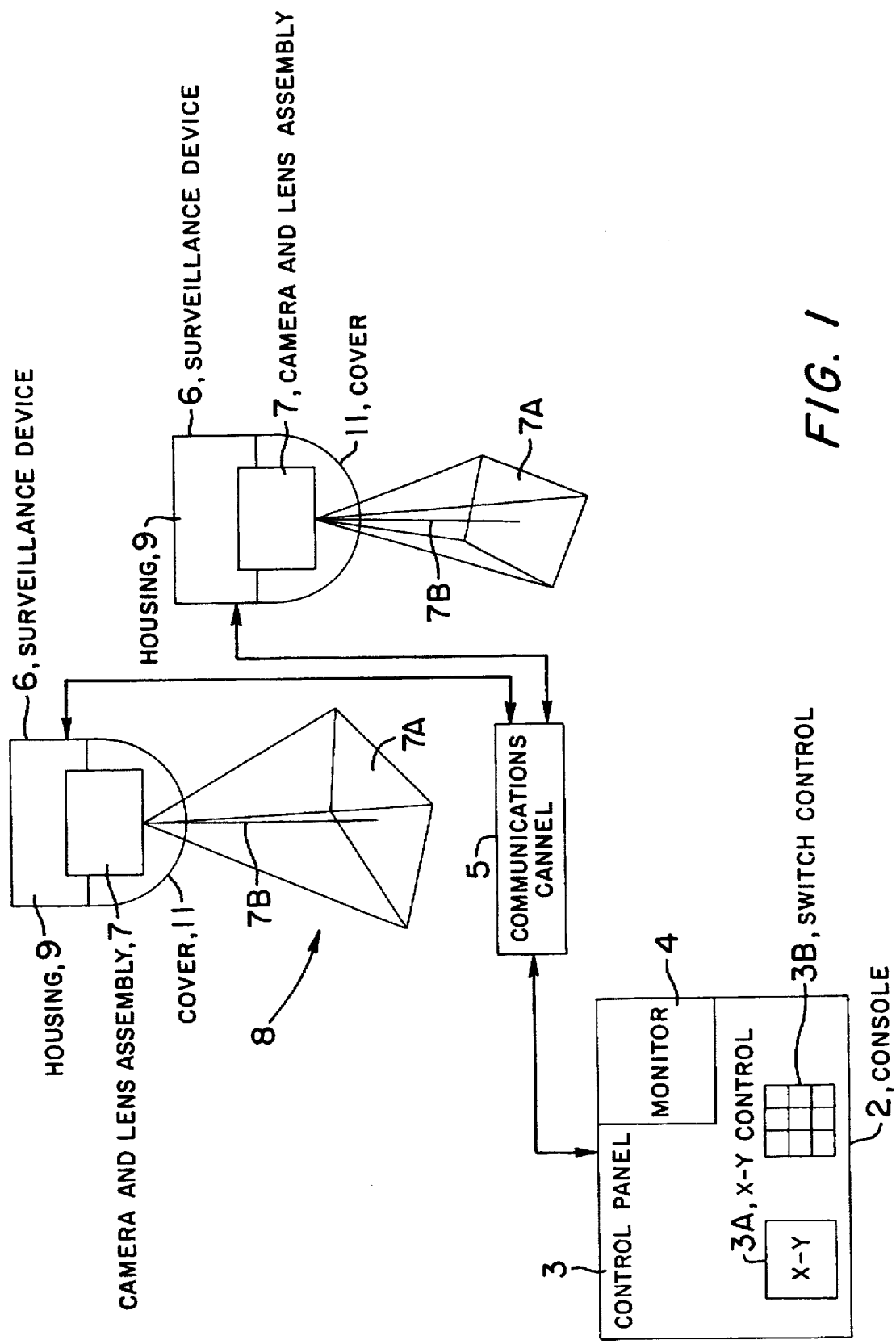
FIG. 1 shows a CCTV system utilizing a surveillance apparatus in accordance with the principles of the present invention.

As shown in FIG. 1, a CCTV system comprises an operator console 2 having a control panel 3 and a monitor 4. Signals pass between the operator console 2 and a plurality of surveillance devices 6 over a communications channel 5.

The surveillance devices 6 each include a camera and lens assembly 7. Each camera and lens assembly 7 views an area of a location 8 which is remote from the operator location and is in the field of view 7A and along the viewing axis 7B of the assembly. Each image is converted by the respective camera and lens assembly 7 into an electrical video signal which is supplied to the operator console 2 over the communications channel 5.

As shown, each surveillance device 6 comprises an upper housing 9 which is fixedly secured to the location 8 and to which the camera and lens assembly 7 is mounted. A dome-like cover 11 closes the open end of the housing and is of a character which permits the passage of light so that the enclosed assembly 7 can view the location.

Figure 2A:
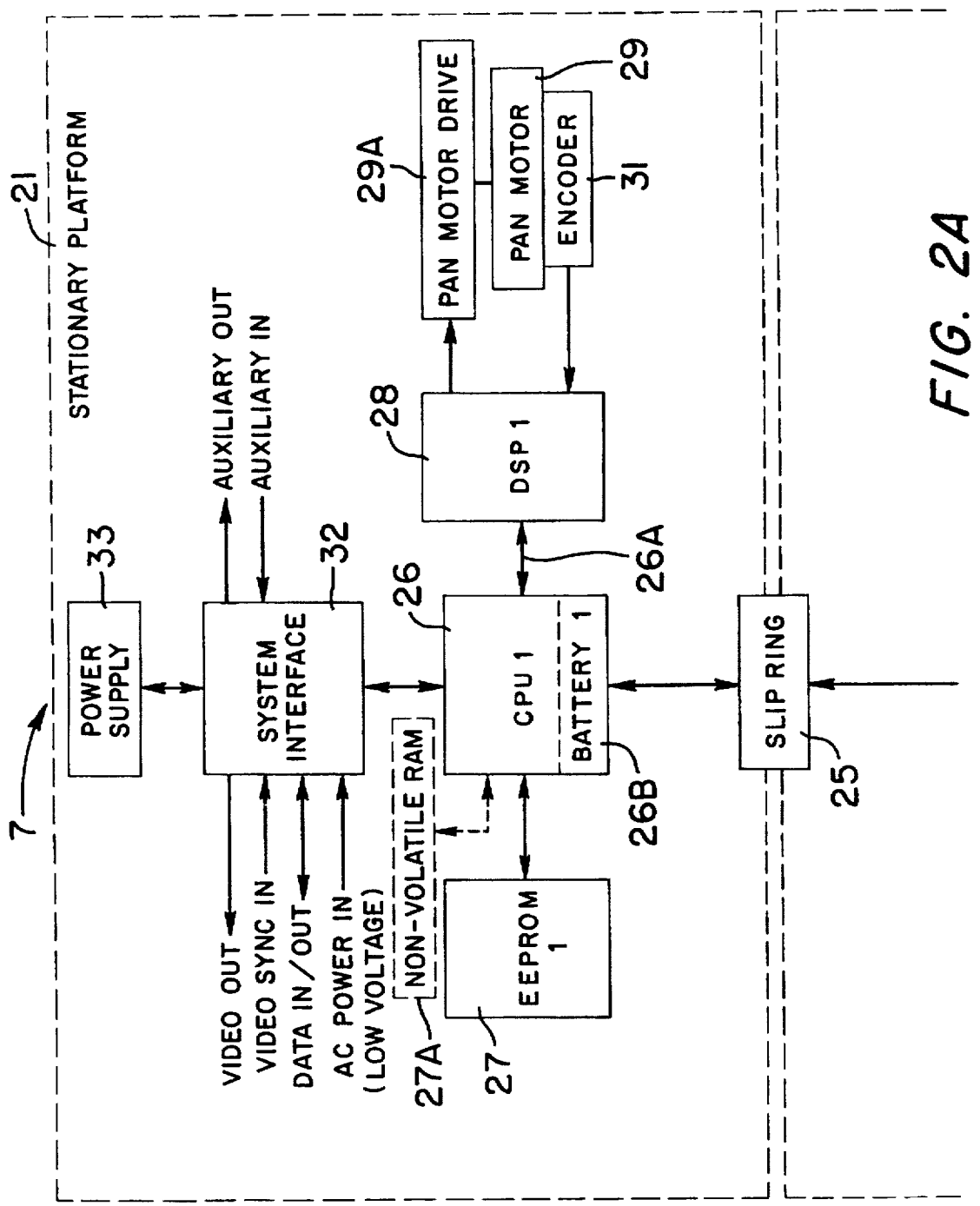
FIG. 2 shows in greater detail a block diagram of the surveillance apparatus of FIG. 1.
Figure 2B:
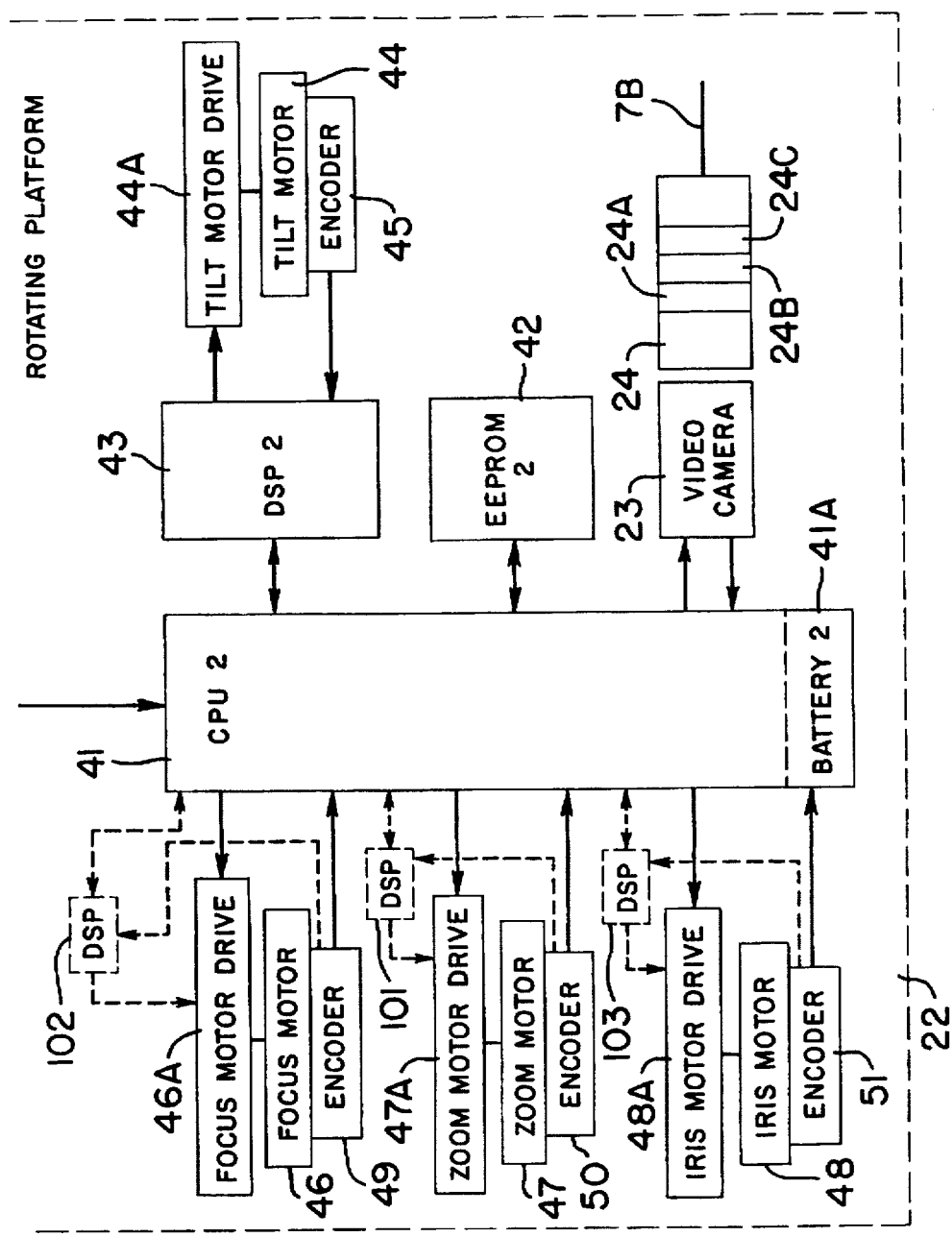

FIG. 2 shows in greater detail a block diagram of the components of the camera and lens assembly 7. As shown, the assembly comprises a stationary platform 21 which can be formed as part of the housing 9. A further platform 22 is rotatably mounted to the platform 21. The platform 22 supports a video camera 23 and a motorized lens assembly 24. The latter components are mounted along a common axis and define the aforementioned field of view 7A and viewing axis 7B of the assembly. Power and various other control signals are routed from the stationary platform 21 to the rotating platform 22 via a slip ring assembly 25. The slip ring assembly 25 includes a brush-block/rotor contact assembly which allows the rotating platform to rotate freely, without concern for any direct wiring becoming twisted.

A first printed circuit board on the stationary platform 21 includes a central processing unit (CPU) 26, an electrically erasable programmable read only memory (EEPROM) 27 or any non-volatile memory 27A, a digital signal processor (DSP) 28, a pan motor drive circuit 29A, an encoder 31, assembly interface circuits 32 and power supply 33. The drive circuit 29A drives a pan motor 29 which causes rotational movement of the platform 22 and thus panning of the viewing axis 7B of the assembly.

A second printed circuit board is provided on the rotating platform 22. This circuit board includes a CPU 41, an EEPROM 42 a DSP 43, a tilt motor drive circuit 44A, an encoder 45, focus motor, zoom motor and iris motor drive circuits 46A, 47A and 48A and associated encoders 49, 50 and 51, respectively. The tilt drive circuit 44A drives a tilt motor 44 for tilting the platform 22 and providing tilting of the viewing axis 7B of the assembly. The focus, zoom and iris circuits 46A, 47A and 48A drive corresponding motors 46, 47 and 48 which rotate associated barrel-like sections 24A, 24B, 24C of the lens 24 for controlling the focus, zoom and iris conditions of the lens and, therefore, the assembly.

As shown, the interface circuit 32 includes a low voltage AC Power In port, a Data In/Out port, a Video Sync In port, and a Video Out port. These ports are coupled to the communication channel 5. The interface 32 also includes Auxiliary Input and Auxiliary Output ports which connect to auxiliary devices.

AC power is routed by the interface 32 to the power supply 33 and is used by the supply to develop a 12 VDC and a 5 VDC signal. The power supply 33 is typically a switching type supply, providing a stable output over a wide range of input voltages. This ensures that assembly 7 will function under varying power-line conditions and with varying lengths of cable. DC power from the supply 33 is distributed to both printed circuit boards and the camera 23.

The Data In/Out ports of the interface 32 provide bi-directional, digital serial communications between the operator console 2 and the assembly 7 over the channel 5. Commands are sent to the assembly 7 based on operator input at the console. The assembly 7, in turn, can transmit data to the console 2 if requested, or it can send un-solicited data such as auxiliary alarm input activations.

The Video Sync In port is an optional port and is used to synchronize the assembly to a master sync in so called "GenLocked" fashion, if desired. The Video Out port delivers the composite video output from the camera 23. The Auxiliary Inputs allow the assembly 7 to be connected to simple "open/close" type switches, or to intrusion alarm devices that have relay type outputs. When the assembly 7 detects the activation of these external devices, it sends the data over the Data In/Out port to the operator console 2 for further processing. The Auxiliary outputs can control external devices such as lights, sirens, door locks, etc. at the location 8. This is accomplished through high power interface circuits such as solid state relays that are external to the assembly and not shown.

The CPU 26 sends and receives high speed data from the operator console 2 (via the Data In/Out port and the system interface circuit 32), processes any commands from the operator console, re-formats and forwards commands to CPU 41 on the rotating platform 22, and controls the pan operation of the motor 29 via DSP 28. DSP 28 is specifically designed to interface with the pan drive circuit 29A and the incremental encoder 31 to provide full closed loop digital motion control of the pan motor 29 and, therfore, the panning condition i.e., the panning of the viewing axis 7B, of the assembly 7.

DSP 28 receives input commands from CPU 26 over a data bus 26A which may be formed as an 8-bit bi-directional multiplexed address data bus. DSP 28 also receives pan position feedback from the incremental encoder 31 which is mechanically linked to the pan motor, and provides position information in the form of quadrature outputs. The encoder feedback is decoded by the DSP 28 into quadrature counts and a 24 bit counter on the DSP keeps track of pan position. The DSP 28 then compares the desired position (or velocity) to the actual position (or velocity) and computes a compensated motor control signal for the pan motor 29 using a programmable digital filter also included in the DSP. The pan motor control signal developed by DSP 28 is preferably a PWM signal where the pulse width or duty cycle controls the speed/torque performance of the pan motor.

The CPU 41, DSP 43, tilt motor drive circuit 44A and encoder 45 perform functions similar to those of CPU 26, DSP 28, pan motor drive circuit 29A and encoder 31 to control the tilt motor 44 and, hence, the tilt condition i.e., tilt position of axis 7B, of the assembly 7. Likewise CPU 41, drive circuits 46A, 47A and 48A and encoders 49, 50 and 51 similarly control the positions of focus, zoom and iris motors, 46, 47 and 48 and, hence, the focus, zoom and iris conditions of the assembly 7. Thus, the movable parts of the assembly affecting these conditions (pan, tilt, focus, zoom and iris) are each controlled by a respective closed loop digital motion control system using PWM signal control.

In providing closed loop motion control, the DSP 28, under control of CPU 26, the DSP 43, under control of CPU 41 and based on commands from CPU 26, and the CPU 41 based again on commands from the CPU 26 can each execute any one of four control programs or algorithms. The particular program executed will depend upon the control to be exercised over the movable part and, therefore, the drive motor, being controlled.

A first control algorithm, designated Position Control, determines the point-to-point position differences between a desired position of a movable part (as converted into a desired position of its drive motor) and the actual position of the movable part (based on the actual position of the drive motor) and generates a PMW signal for moving the part via the drive motor to maintain the original position (this is done without velocity profiling). This algorithm basically keeps the movable part at the "stopped" position, even if an external force (such as gravity) attempts to move it.

A second control algorithm, designated Integral Velocity Control, performs continuous velocity profiling for a movable part. This is specified by a command velocity and a command acceleration. Velocity and acceleration of a movable part can be changed at any time to continuously profile velocity in time. Once the specified command velocity is reached, it will be maintained until a new command is specified. Changes between actual velocities occur at the presently specified linear command acceleration. This algorithm provides for variable speed operation of a movable part of assembly 7, where the part accelerates at a specified rate to a desired increase in speed and decelerates at a specified rate to a desired decrease in speed. This allows the system operator to send from the console 2 to the assembly 7 a series of discrete speed commands which will be integrated so that the transitions from one speed to the next appear very smooth.

A third control algorithm, designated Trapezoidal Profile Control, performs point-to-point position moves of a movable part of the assembly 7 and profiles the velocity trajectory to a trapezoid or triangle. The desired final position, the acceleration and the maximum velocity are specified by the CPU 26 or 41 based upon command data from the system operator. The necessary profile is then computed by the DSP 28 or 43 or the CPU 41 to conform to the command data. If maximum velocity is reached before the distance halfway point, the profile will be trapezoidal, otherwise the profile will be triangular.

This algorithm provides for moving the movable parts of the assembly 7 so the assembly can view a target or pattern of targets, where the current position is known and the movable part: must move to the desired position. This allows the operator at the console 2 to send the desired target command to the assembly 7, where a point-to-point profile will then be computed for each movable part required to be moved to bring the assembly to the target. Each profile will cause the respective part to be accelerated by its respective drive motor to a maximum velocity and then decelerated by the drive motor to a stop at the desired position.

A fourth control algorithm, designated Proportional Velocity Control, performs control of motor speed and, therefore, the speed of the corresponding movable part, using only the gain factor for compensation, and does not attempt to maintain a specified speed. This algorithm can be used to provide qualitative information about the mechanics of a movable part and its corresponding motor. Used as a diagnostic function, this algorithm can be used by the CPUs and DSPs to determine the existence and location of any "rough" spots in the movement of a movable part.

As above-indicated, the EEPROM 27 connected to CPU 26 can be erased and re-programmed directly by CPU 26. The EEPROM 27 contains the programs (i.e., the program code) and possibly other information relative to the surveillance device 6. This other information might contain the serial number, date of manufacture, the model type of the camera 23 and lens 24, the revision levels of other components of the device 6 and even the dates and specifics of any field modifications performed on the device. Since CPU 26 can erase and re-program the EEPROM 27, the operator at console 2 can "upload" new programs or modification to existing programs for operating the surveillance device 6, providing an efficient way to fix program code bugs or to add new program features.

The batteries 26B and 41A associated with CPUs 26 and 41 provide several hours of non-volatile RAM memory to each CPU. This avoids, in the case of CPU 26, the need to "up-load" records such as target, pattern and boundary coordinates in the event that AC power is momentarily lost.

As above-indicated, the CPU 41 receives data from CPU 26 (via the slip-ring assembly) and processes commands from CPU 26, to control the operation of the zoom, focus and iris motors 46, 47 and 48 and to control the operation of the tilt motor 44 via the DSP 43. The tilt condition of the assembly 7 is thus controlled with a dedicated DSP as is the pan condition, while the zoom, focus and iris conditions are controlled directly by a CPU (the CPU 41 in the present case). This configuration reduces the overall cost of the surveillance device 6, but still ensures the more precise control required of the pan and tilt movable parts. Alternatively, dedicated DSPs (shown in dotted line in FIG. 2 as DSPs 101, 102 and 103) could be used to control each of the zoom, focus and iris conditions of the assembly 7 to provide a greater degree of performance at the additional expense of the added DSPS.

As can be appreciated, with the surveillance device 6 configured as described above, the velocity of each of the movable parts associated with the various conditions of the device 6 can be controlled to provide a wide range of operational speeds. Variable speeds provide the operator at the console 2 with a more natural and effective means of controlling the surveillance device. For example, the velocity of the pan movement can now be made fast enough for the operator to follow a subject walking at a fast pace close to the surveillance device. The velocity of such pan movement can also be made slow enough for the operator to precisely position the device on a specific target located far from the device, with the device in a zoomed-in condition.

Velocity of a movable part of the device 6 can be controlled by the operator at the console 2 in a number of ways. In a first technique, a different signal is sent from the console as a control position is changed. An example of this type of control is a "joy stick" or "x-y platform" type of control 3A at the console. This type of control sends out a different speed signal to the device 6 as its angle of deflection or x-y displacement is increased or decreased.

A second technique uses a simple switch control 3B. Initial pressing of the switch results in a signal at the device 6 indicative of a relatively slow control speed for the movable part. However, if the switch is held down, the resultant signal causes the control speed to be gradually increased to some maximum speed. If a large change in position is desired, depressing and holding the switch provides a signal, which causes a ramping-up of the control speed to it's maximum rate. If a small change in position is desired, quickly pressing and releasing the switch signals a slow control speed, providing better accuracy.

Additionally, with the surveillance device 6 configured as above, the acceleration of the movable parts controlling the device conditions can be controlled so that the parts move smoothly over a wide range of speeds and have "soft" starts and stops. Smooth operation is achieved via the algorithms discussed above by gradually changing (ramping) a speed of a movable part from a current speed to a new speed instead of jumping from the current speed to the new speed. Likewise, soft starts are realized by ramping the speed from a stopped condition to the desired speed, while soft stops are achieved by gradually slowing or decreasing the speed to a stopped condition. This approach minimizes wear and allows the use of smaller, lighter weight motors and gearboxes.

Another important advantage of the surveillance device 6 is that the CPU 26 is aware of the precise position information concerning the assembly conditions, i.e., it "knows" the position of the viewing axis 7B of the camera and lens assembly 7 (pan and tilt positions) and it knows what the zoom, focus and iris settings are. The CPU 26 can thus use this positional information for implementing a number of unique features of the surveillance device 6 described below.

1. Intelligent End-Stop Detection

The CPU 41 of the device 6 is further adapted to utilize the above-discussed closed loop control of the movable parts of the assembly 7 to provide unique end-stop detection and end-of-travel stopping of the movable parts. At start-up, the CPU 41 causes each part controlling the tilt, zoom, focus and iris conditions of the assembly 7 to be slowly driven to one end of their respective path of travel. This position is considered the calibration or home position of the part and is stored in memory. The CPU 41 then drives each part to its respective opposite end-of-travel and stores this position as the part's maximum travel position. In effect, the CPU 41 thus learns the range of travel of each movable part at power-up.

With these learned positions, during operation of the surveillance device 6, the CPU can ensure that each movable part of the assembly 7 is not driven beyond its home or end-of-travel position by comparing present position data with the stored data related to these positions. As a result, with the surveillance device 6, end-stop protection can be achieved readily and accurately without the need for switches, slip clutches or current detection.

2. Zoom Proportional Pan/Tilt Control

In this case, the CPU 26 and CPU 41 take into account the current position of the movable part controlling the zoom condition of assembly 7 and then appropriately scale the speeds of the movable parts controlling the pan and tilt positions of the assembly. If the movable part controlling zoom has a position indicating a wide-angle zoom condition or setting, the pan and tilt speeds will be scaled toward faster speeds, allowing the camera and lens assembly 7 to be moved and positioned quickly. If the position of the movable part controlling zoom indicates a telephoto condition or setting, the pan and tilt speeds will be scaled toward the slower speeds, allowing the assembly 7 to be precisely positioned.

3. Depth of Field (Zoom and Iris) Proportional Focus Control

The CPU 41 in this situation takes into account the current positions of the movable parts controlling the zoom and iris conditions and then appropriately scales the speed of the movable part controlling the focus condition of the assembly. Under bright-light conditions and a large depth-of-field (i.e., the iris is substantially closed and the zoom is at wide angle or zoomed-out), the focus range is less critical. Accordingly, the CPU 41 adjusts the speed of the movable part controlling focus such that fast focusing speeds are realizable. This allows the full focus range to be quickly traversed to achieve an in-focus condition.

Under low-light conditions and a shallow depth-of-field (i.e., the iris is substantially opened and zoom is at telephoto or zoomed-in), the focus range is more critical. Accordingly, in this case, the CPU 41 causes the movable part controlling focus to take on slower speeds, allowing for precise focusing of the object. In this case also, if the focus condition is significantly out-of-adjustment, the slower control causes the time for adjusting focus to be long. Accordingly, the CPU 26 is further adapted to be able to "ramp-up" the speed after an initial slow speed so that the adjustment process can be carried out more quickly.

4. Faster. More Accurate Targets or Presets (Point-to-Point Moves)

As above-indicated, a target is a specific image in the location 8 and requires the surveillance device 6 to take on specific pan, tilt, zoom, iris and focus conditions. Once these conditions are defined, a target can be called-up manually by the operator at the console 2, or automatically by the console 2 (based on some external event). Fast and accurate target acquisition is thus achievable with the device 6.

In particular, due to the closed-loop control, home-up (or calibration) of a target is required only once at power-up. This characteristic, in combination with accurate positional information, velocity control, and acceleration control, enables the device 6 to access targets very quickly. The device 6 achieves this by starting each movable part required to be moved to reach a target at a slow speed, quickly accelerating the part to a much higher speed, then decelerating the part to a slow speed before coming to a complete stop at the desired target. This is accomplished by using the above-discussed trapezoidal profile control with the above-discussed integral velocity and acceleration control.

More particularly, the speed of a part is slowly and smoothly increased from stand-still to a maximum speed. Maximum speed is then maintained for an appropriate time. A controlled deceleration is then carried out gradually and smoothly slowing the speed of the part to bring the part to a complete stop. Smooth operation thus results even to the extent of overcoming mechanical irregularities in the movable parts.

Also, position accuracy is maintained regardless of the irregularities and outside forces. In this way, a target is reached in the fastest way possible with a minimum of stress on the driving motor and associated gearing. The result is that for a worst-case target move (180° of pan travel), the target can be reached in less than 1 second where conventional devices might take 8 or more seconds.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. Apparatus comprising:
   a central processing unit for receiving commands for controlling a camera and lens assembly means of a CCTV system, said commands being from a remote operator control means of said CCTV system;
   camera and lens assembly means, said camera and lens assembly means including at least first, second, third, fourth and fifth movable parts for controlling the pan, tilt, zoom, focus and iris conditions, respectively, of said camera and lens assembly means;

a first closed loop digital motion control means responsive to said first movable part and to said central processing unit for controlling said first movable part so as to control said pan condition, said first closed loop digital motion control means including a first dedicated digital signal processor responsive to said first movable part and to said central processing unit for exclusive control of said first movable part, said first dedicated digital signal processor exercising no control over any other movable part for controlling any other condition of said camera and lens assembly;

second, third, fourth and fifth closed loop digital motion control means responsive to said central processing unit and to the positional state of said second, third, fourth and fifth movable parts, respectively, for controlling said second, third, fourth and fifth movable parts, respectively, so as to control said tilt, zoom, focus and iris conditions, respectively, said second closed loop digital motion control means including a second dedicated digital signal processor responsive to said second movable part and to said central processing unit for exclusively controlling said second movable part;

a further central processing unit responsive to said central processing unit;

and said third, fourth and fifth closed loop digital motion control means and said second dedicated digital signal processor of said second closed loop digital motion control means being responsive to said further central processing unit for controlling said third, fourth, fifth and second movable parts, respectively.

2. Apparatus in accordance with claim 1 further comprising:

a housing for supporting said camera and lens assembly means so as to permit movement of said first movable part;

and a dome like-member removably attachable to said housing so as to enclose said camera and lens assembly means.

3. Apparatus in accordance with claim 2 wherein:
said dome like member is a part of a sphere in shape.

4. Apparatus in accordance with claim 1 wherein:
said first dedicated digital signal processor generates a pulse width modulation (PWM) signal for controlling said first movable part.

5. Apparatus in accordance with claim 4 wherein:
said first closed loop digital motion control means includes first means for sensing a positional state of said first movable part and said first dedicated digital signal processor is responsive to said first means and compares said sensed positional state of said first movable part with a desired positional state which is based upon commands received from said central processing unit to develop said PWM control signal.

6. Apparatus in accordance with claim 5 wherein:
said first movable part includes a first motor for moving said first movable part;
and said PWM control signal is applied to said first motor.

7. Apparatus in accordance with claim 6 wherein:
said first means monitors said first motor to sense said positional state of said first movable part.

8. Apparatus in accordance with claim 1 further comprising:

memory means responsive to said central processing unit for storing program means for controlling said first dedicated digital signal processor, said central processing unit responsive to said operator control means receiving program means from said operator control means for storing in said memory means, said apparatus being at a location remote from the location of said operator control means.

9. Apparatus in accordance with claim 8 wherein:
said memory means comprises one of an EEPROM and a non-volatile RAM.

10. Apparatus in accordance with claim 1 further comprising:
a remote operator means for transmitting commands to said central processing unit.

11. Apparatus in accordance with claim 10 wherein:
said apparatus further includes memory means for storing one or more speed profile characteristics;
and said central processing unit selectively causes said first dedicated digital signal processor to use a particular one of said speed profile characteristics in controlling said first movable part.

12. Apparatus in accordance with claim 7 further comprising:
a stationary platform for supporting said central processing unit and said first closed loop digital motion control means;
and a rotating platform for supporting said further central processing unit and said second, third, fourth and fifth closed loop digital motion control means.

13. Apparatus comprising:
camera and lens assembly means for use in a CCTV system, said camera and lens assembly means including at least a first movable part for controlling at least one condition of said camera and lens assembly means, said one condition being one of the pan, tilt, focus, iris and zoom conditions of said camera and lens assembly means, and said first movable part having a first end-of-travel position at which said first movable part reaches the maximum length that said first movable part can travel in a first direction and a second end-of-travel position at which said first movable part reaches the maximum length that said first movable part can travel in a second direction opposite to said first direction;

and a first closed loop digital motion control means responsive to said first movable part for controlling said first movable part so as to control said one condition, said first closed loop motion control means including a digital signal processor responsive to said first movable part for control of said first movable part, said digital signal processor storing said first and second end-of-travel positions in a memory and utilizing said stored first and second end-of-travel positions during control of said first movable part to stop the movement of said first movable part by the time said first movable part reaches said first and second end-of-travel positions.

14. A method comprising:
providing a camera and lens assembly including a first movable part for controlling at least one condition of said camera and lens assembly, said one condition being one of the pan, tilt, focus, iris and zoom conditions of said camera and lens assembly, said first movable part having a first end-of-travel position at which said first movable part reaches the maximum length that said first movable part can travel in a first direction and a second end-of-travel position at which said first movable part reaches the maximum length that said first movable part can travel in a second direction opposite to said first direction;

and in response to said first movable part, controlling said first movable part to control said one condition using a first closed loop digital motion control system having a digital signal processor responsive to said first movable part for control of said first movable part, said digital signal processor storing said first and second end-of-travel positions in a memory and utilizing said stored first and second end-of-travel positions during control of said first movable part to stop movement of said first movable part by the time said first movable part reaches said first and second end-of-travel positions.

15. Apparatus comprising:

camera and lens assembly means for use in a CCTV system, said camera and lens assembly means including at least a first movable part for controlling at least one condition of said camera and lens assembly means, said one condition being one of the pan, tilt, focus, iris and zoom conditions of said camera and lens assembly means, and said first movable part having a first end-of-travel position at which said first movable part reaches the maximum length that said first movable part can travel in a first direction and a second end-of-travel position at which said first movable part reaches the maximum length that said first movable part can travel in a second direction opposite to said first direction;

and control means for controlling said first movable part so as to control said one condition, said control means storing said first and second end-of-travel positions and utilizing said stored first and second end-of-travel positions during control of said first movable part to stop the movement of said first movable part by the time said first movable part reaches said first and second end-of-travel positions.

16. A method comprising:

providing a camera and lens assembly including a first movable part for controlling at least one condition of said camera and lens assembly, said one condition being one of the pan, tilt, focus, iris and zoom conditions of said camera and lens assembly, said first movable part having a first end-of-travel position at which said first movable part reaches the maximum length that said first movable part can travel in a first direction and a second end-of-travel position at which said first movable part reaches the maximum length that said first movable part can travel in a second direction opposite to said first direction;

and controlling said first movable part to control said one condition using a control system, said control system storing said first and second end-of-travel positions and utilizing said stored first and second end-of-travel positions during control of said first movable part to stop movement of said first movable part by the time said first movable part reaches said first and second end-of-travel positions.

17. A method comprising:

providing a central processing unit for receiving commands for controlling a camera and lens assembly of a CCTV system, said commands being from a remote operator control means of said CCTV system;

providing a camera and lens assembly including first, second, third, fourth and fifth movable parts for controlling the pan, tilt, zoom, focus and iris conditions, respectively, of said camera and lens assembly;

in response to said first movable part and to said central processing unit, controlling said first movable part to control said pan condition using a first closed loop digital motion control system having a first dedicated digital signal processor responsive to said first movable part and to said central processing unit for exclusive control of said first movable part, said controlling using said first dedicated digital signal processor exercising no control over any other movable part controlling any other condition of said camera and lens assembly;

in response to said second, third, fourth and fifth movable parts and to said central processing unit, controlling said second, third, fourth and fifth movable parts to control said tilt, zoom, focus and iris conditions, respectively, using second, third, fourth and fifth closed loop digital motion control systems, respectively;

providing a further central processing unit responsive to said central processing unit:

said second closed loop digital motion control system including a second dedicated digital signal processor responsive to said second movable part and to said central processing unit for exclusively controlling said second movable part;

and said third, fourth and fifth closed loon digital motion control systems and said second dedicated digital signal processor of said second closed loop digital motion control system are responsive to said further central processing unit for controlling said third, fourth, fifth and second movable parts, respectively.

18. The method of claim 17 further comprising:

providing a housing for supporting said camera and lens assembly so as to permit movement of said first movable part;

and providing a dome like-member removably attachable to said housing so as to enclose said camera and lens assembly.

19. A method in accordance with claim 17 wherein:

said first dedicated digital signal processor generates a pulse width modulation signal for controlling said first movable part.

20. A method in accordance with claim 19 wherein:

said first dedicated digital signal processor senses a positional state of said first movable part and compares said sensed positional state of said first movable part with a desired positional state which is based upon commands received from said central processing unit to develop said PWM control signal.

21. A method in accordance with claim 20 wherein:

said first movable part includes a first motor for moving said first movable part;

and said PWM control signal is applied to said first motor.

22. A method in accordance with claim 21 wherein:

said first dedicated digital signal processor monitors said first motor to sense said positional state of said first movable part.

23. A method in accordance with claim 17 further comprising:

providing a stationary platform for supporting said central processing unit and said first closed loop digital motion control system;

and providing a rotating platform for supporting said further central processing unit and said second, third, fourth and fifth closed loop digital motion control systems.

24. Apparatus comprising:

camera and lens assembly means for use in a CCTV system, said camera and lens assembly means including at least a first movable part for controlling the pan condition of said camera and lens assembly means and at least a second movable part for controlling the tilt condition of said camera and lens assembly means, said camera and lens assembly means defining a view axis along which an image can be viewed and said camera and lens assembly having a zoom condition which is determinative of the size of the image and the extent of the field of view to be viewed;

first closed loop digital motion control means responsive to said first movable part for controlling the speed of said first movable part so as to control said pan condition, said first closed loop digital motion control means including a first digital signal processor responsive to said first movable part for control of the speed of said first movable part, and said first digital signal processor being automatically responsive to said zoom condition when controlling the speed of said first movable part to control the speed of said first movable part and said pan condition in dependence on said zoom condition;

and a second closing loop digital motion control means responsive to said second movable part for controlling the speed of said second movable part so as to control said tilt condition, said second closed loop digital motion control means including a second digital signal processor responsive to said second movable part for control of the speed of said second movable part, and said second digital signal processor being automatically responsive to said zoom condition when controlling the speed of said second movable part to control said speed of said second movable part and said tilt condition in dependence on said zoom condition.

25. Apparatus in accordance with claim 24, wherein:

said first dedicated digital signal processor controls the speed of said first movable part such that for zoom conditions indicative of images of increased size and field of views of lesser extent said first dedicated digital signal processor selects decreased speeds for said first movable part; and said second dedicated digital signal processor controls the speed of said second movable part such that for zoom conditions indicative of images of increased size and field of views of lesser extent said second digital signal processor selects decreased speeds for said second movable part.

* * * * *

UNITED STATES PATENT AND TRADEMARK OFFICE
CERTIFICATE OF CORRECTION

PATENT NO. : 5,801,770

DATED : September 1, 1998

INVENTOR(S) : Robert Paff, et al.

It is certified that error appears in the above-identified patent and that said Letters Patent is hereby corrected as shown below:

Column 7, line 50, delete ":".

Signed and Sealed this

Sixteenth Day of February, 1999

Attest:

Attesting Officer

Acting Commissioner of Patents and Trademarks